Nov. 6, 1945.   L. G. MILLER   2,388,336
AUTO TRAILER BRAKE
Filed Sept. 25, 1943   2 Sheets-Sheet 1
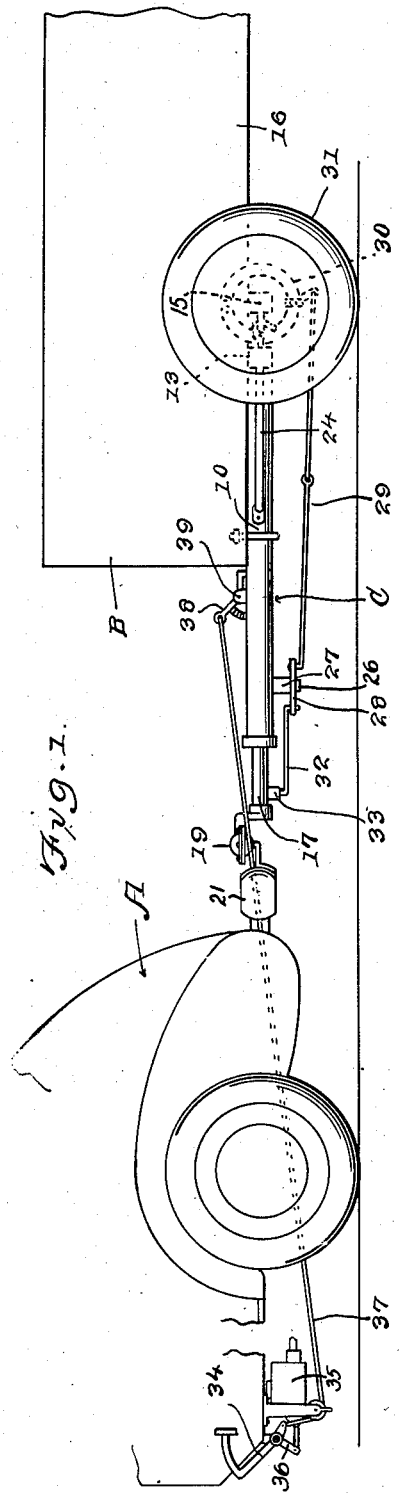
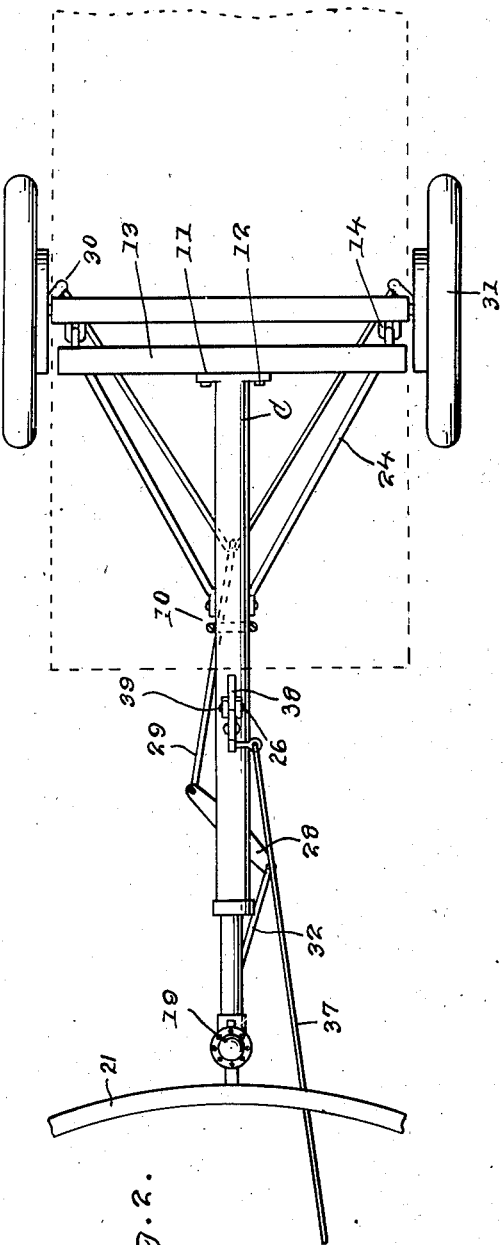
INVENTOR.
Leo G. Miller
BY
Victor J. Evans & Co.
ATTORNEYS Nov. 6, 1945.    L. G. MILLER    2,388,336
AUTO TRAILER BRAKE
Filed Sept. 25, 1943    2 Sheets-Sheet 2
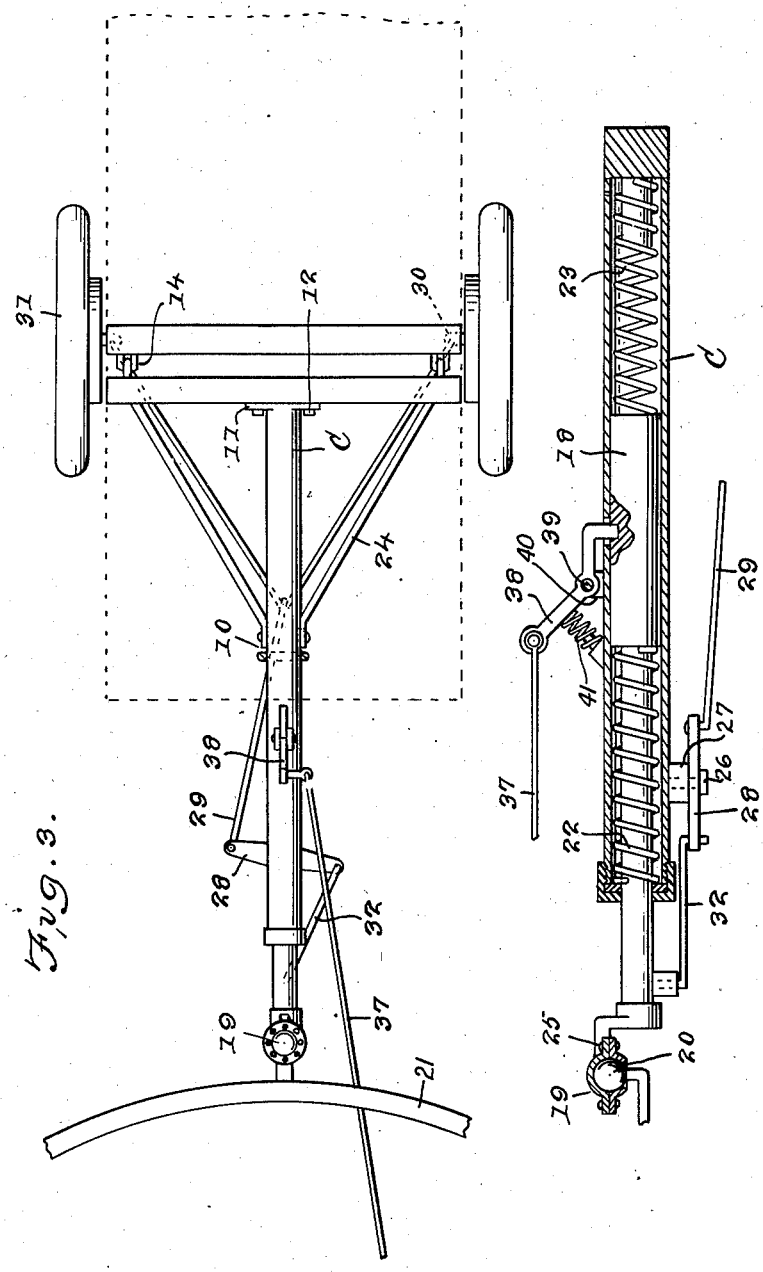
INVENTOR.
Leo G. Miller
BY
Victor J. Evans & Co.
ATTORNEYS Patented Nov. 6, 1945

2,388,336

UNITED STATES PATENT OFFICE 2,388,336

AUTO TRAILER BRAKE

Leo G. Miller, Wichita, Kans.

Application September 25, 1943, Serial No. 503,802

2 Claims. (Cl. 188—142)

The invention relates to automobile brakes, and more particularly to a brake tongue for trailers or the like.

The primary object of the invention is the provision of a tongue of this character, wherein the same constitutes the draft hitch between a trailer and a draft vehicle, such for example, as a motor vehicle or other medium, and in the working of the said tongue the brakes to the trailer will be applied and released automatically when the brake pedal of the draft medium is actuated, thereby perfect control of the trailer will be assured when under draft.

Another object of the invention is the provision of a tongue of this character, wherein the construction thereof is unique and novel, it being applicable to various types of drawn vehicles having brakes, so that the latter can be automatically operated and under control of the operator of the draft vehicle when the drawn vehicle `s coupled or hitched therewith.

A further object of the invention is the provision of a tongue of this character, wherein the same not only effects a hitch for a trailer or the like but also assures brake control of the latter, and this control is mastered by the operator of the lead vehicle.

A further object of the invention is the provision of a tongue of this character, which is simple in construction, thoroughly reliable and efficient in operation, automatic in its working, strong, durable, readily and easily applied, conveniently controlled, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a fragmentary side elevation of a draft vehicle and trailer, showing the tongue constructed in accordance with the invention applied and in normal non-braking position.

Figure 2 is a fragmentary top plan view thereof.

Figure 3 is a view similar to Figure 2 showing the trailer brakes applied.

Figure 4 is a sectional view through the tongue with the parts in the position as shown in Figure 3.

Similar reference characters indicate corresponding parts throughout the several views in the drawings.

Referring to the drawings in detail, A designates generally a portion of a motor vehicle, and B a trailer vehicle, respectively, the motor vehicle A being the draft medium for the trailer vehicle, as is usual. These vehicles A and B are hitched together by a tongue denoted generally at C, and constitutes the present invention as will be hereinafter described.

The tongue comprises a straight cylindrical or tubular section 10 having securing ears 11 at one end thereof, in this instance, the rearmost end, and these ears 11 are fastened to the center 12 of a cross bar 13, which through coupling links 14 is attached to an axle support 15 of the body 16 of the trailer vehicle B.

Slidably telescoped into the section 10 is a plunger section 17 having at its inner end an enlarged rounded piston head 18, while at the forward or outermost end is a universal joint female member 19, the male member 20 of this joint being fixed centrally to the rear bumper 21 of the vehicle A. In this manner the tongue C effects a hitch between the vehicles A and B, respectively.

Located within the section 10 at opposite sides of the piston head 18 are front and rear cushioning springs 22 and 23, respectively, they being properly stationed in any suitable manner within the said section 10 and against which works the head 18 for cushioning action thereon when the section 17 is freed.

The section 10 is laterally braced by brace rods 24 fixed thereto and to the cross bar 13 in any desirable manner. The universal female and male members 19 and 20 are separably fastened together in coupling relation to each other by fasteners 25.

Pivoted at 26 to a bearing 27 on the section 10 exteriorly thereof is a rocking lever 28, which at one end thereof has loosely connected thereto a throw link 29, the latter being operatively connected to the brake mechanism 30 for the ground wheel 31 of the trailer vehicle B, while the other end of the lever 28 has loosely connected therewith a link 32, it being swiveled in a socketed boss 33 on the section 17, so that on displacement of these sections 10 and 17 with respect to each other the brake mechanism 30 will be automatically operated, when the section 17 is freed within the section 10.

Within the vehicle A as usual is a foot operated brake pedal 34 for controlling the brake mechanism of this vehicle A, and in this instance the said brake mechanism is of the hydraulic type, only a portion thereof being indicated at 35.

This pedal 34 has a crank arm 36 to which is connected a cable 37, which is trained to and connected with a latching dog 38 pivoted at 39 and vertically swingable in a bearing 40 on the section 10, to engage with and disengage from the head 18 when in a neutral position.

The dog 38 is pressed into latching position by a spring 41 acting against the same. The dog 38 is controlled by the foot brake pedal 34 within the vehicle A.

When the vehicle A is brought to a standstill by the application of its brake mechanism 35 which is accomplished by operating the pedal 34, the latter concurrently therewith pulls upon the cable 37 which lifts the dog 38 for the release of the section 17 within the section 10 and the sudden forward thrust of the trailer vehicle B operates the brake mechanism 30 thereon for the instant application of the latter to stop momentum of the trailer to bring it to a standstill.

When the brake mechanism 35 on the vehicle A is released the dog 38 is simultaneously released to have it engage with the head 18 which under the action of the cushioning springs 22 and 23 will come to a neutral position and the brake mechanism 35 on the trailer vehicle B will be released position.

The brake mechanism 30 and 35 when freed allows the vehicle A to draft the vehicle B as is usual when these vehicles are hitched together in a manner as before described and illustrated in the drawings.

From the foregoing it is believed that the construction and manner of operation of the invention will be clearly understood, and therefore, a more extend explanation has been omitted as well as for the sake of brevity.

What is claimed is:

1. In a draft vehicle having brake mechanism, and a trailer having brake mechanism, a tongue device connecting the draft vehicle with the trailer and comprising relatively slidable telescoping sections, one of which has a piston head receivable in the other and normally positioned at an intermediate point between its ends, a pair of springs in said latter section in front and in back of the head to normally center the same in a neutral position, said latter section having securing ears at the rearmost end thereof, a cross bar parallel to the axle of said trailer, links coupling said cross bar to said axle, said cross bar being secured to said latter section by means of said securing ears at right angular relation therewith, a universal female member on the forward end of said first section, a universal male member fixed centrally to the rear bumper of said draft vehicle adapted to coact with said female member to universally join the forward section to said draft vehicle, a latch device engaging said head in the neutral position and connected with the brake mechanism of the draft vehicle for actuation to release the head on braking of the draft vehicle a pivoted rocking lever on the latter section, and link connections to the first section and to the trailer brake mechanism to actuate the trailer brakes when the sections are released to move relative each other.

2. In a draft vehicle having brake mechanism, and a trailer having brake mechanism, a tongue device connecting the draft vehicle with the trailer and comprising relatively slidable telescoping sections, one of which has a piston head receivable in the other and normally positioned at an intermediate point between its ends, a pair of springs in said latter section in front and in back of the head to normally center the same in a neutral position, said latter section having securing ears at the rearmost end thereof, a cross bar parallel to the axle of said trailer, links coupling, said cross bar to said axle, said cross bar being secured to said latter section by means of said securing ears at right angular relation therewith, a universal female member on the forward end of said first section, a universal male member fixed centrally to the rear bumper of said draft vehicle adapted to coact with said female member to universally join the forward section to said draft vehicle, a spring actuated automatic latching device to hold said head in a neutral position and connected with the brake mechanism of the draft vehicle for actuation to release the head on braking of the draft vehicle, a pivoted rocking lever on the latter section, a link connection from said lever to the first section, and a throw lever connected with the said rocking lever and the brake mechanism of the trailer to actuate the trailer brakes when the sections are released to move relative each other.

LEO G. MILLER.